(12) United States Patent
Eichhorn

(10) Patent No.: US 12,541,083 B2
(45) Date of Patent: Feb. 3, 2026

(54) APPARATUS AND METHOD FOR DYNAMICALLY ADJUSTING A LIGHT RAY

(71) Applicant: Carl Zeiss Microscopy GmbH, Jena (DE)

(72) Inventor: Christoph Eichhorn, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 282 days.

(21) Appl. No.: 18/517,994

(22) Filed: Nov. 22, 2023

(65) Prior Publication Data

US 2024/0176124 A1    May 30, 2024

(30) Foreign Application Priority Data

Nov. 29, 2022    (DE) ...................... 10 2022 212 740.4

(51) Int. Cl.
*G02B 21/00* (2006.01)
*G02B 26/08* (2006.01)

(52) U.S. Cl.
CPC ..... *G02B 21/0032* (2013.01); *G02B 26/0875* (2013.01)

(58) Field of Classification Search
CPC . G02B 21/0032; G02B 26/0875; G02B 21/06
See application file for complete search history.

(56) References Cited

U.S. PATENT DOCUMENTS 7,692,879 B2 *   4/2010   Steinert .............. G02B 21/0052
                                                        359/368
2018/0217349 A1 *   8/2018   Jin ...................... G02B 27/0944

* cited by examiner

*Primary Examiner* — Mariam Qureshi
(74) *Attorney, Agent, or Firm* — DUANE MORRIS LLP

(57) ABSTRACT

An apparatus and method for adjusting a light ray (13) in a beam path of a microscope. The apparatus includes a plate (3) arranged in the beam path and transparent to the wavelength range of the light ray (13) to be adjusted; a first drive (5) for generating a tilt movement of the plate (3) about a first axis (7) directed orthogonally to the beam path; and a second drive (8) for generating for generating a tilt movement of the plate (3) about a second axis (9) directed both orthogonally to the beam path and orthogonally to the first axis (7). The first axis (7) and the second axis (9) are directed through a centre of the plate (3); the actuating forces caused by the first drive (5) are transferred to the plate (3) by means of a lever (10); the first drive (5) and the second drive (8) are arranged within an angular range of 180° about the optical axis (2) of the beam path; and the plate (3) can be tilted about each of the axes (7, 9) by an absolute angular value of up to 70° about a zero position.

8 Claims, 2 Drawing Sheets

APPARATUS AND METHOD FOR DYNAMICALLY ADJUSTING A LIGHT RAY

RELATED APPLICATION

The present application is a U.S. National Stage application of German Application No. DE 10 2022 212 740.4 filed on Nov. 29, 2022, the contents of which are herein incorporated by reference in their entirety.

FIELD OF THE INVENTION

The invention relates to an apparatus and a method for dynamically adjusting a light ray, as are specified in the preambles of the independent claim and the alternative independent claim, respectively.

BACKGROUND OF THE INVENTION

A requirement frequently found in optical systems is that of guiding light rays or bundles of light rays (beams) along beam paths and controllably deflecting these light rays or beams where necessary. This is especially the case if some optical components of the optical system are movable and/or can be replaced.

A known technical option for the deflection of rays is given by the use of what are known as mirror steps. Two mirrors which are parallel opposite one another to a first approximation and adjustable in terms of their angle bring about a spatial offset between an incoming ray and the corresponding departing ray, and a correction of an angular error occurring as a consequence of the reflections. The spatial offsets introduced by such an optomechanical assembly are large, placing particular demands on the installation space and the optical design. Further, the sensitivity is high on account of the double reflection and the large number of individual degrees of freedom mean that a motor-based adjustment becomes very complicated.

A further option for adjusting a location in optical systems is offered by the use of plane parallel glass plates, which are used in transmission and can be tilted in a targeted fashion. In this case, the spatial offset between the incident and departing ray is dependent on the refractive index, the material strength and the current tilt angle. On account of the lower sensitivity of these assemblies operating in transmission, it is easier to implement motorization than in the case of solutions based on reflections.

In a solution known from the prior art, two of the transparent glass plates (occasionally also referred to as "wobble plates") are arranged in the beam path in succession. Each of the plates can be tilted about an axis under motor control, with the tilt axes usually being perpendicular to one another. Unwanted reflections occur at each interface transition of the plates, and these, especially in detection systems, have a negative effect on the amount of light incident on a detector. Further, the amount of installation space claimed in the beam path is large on account of the serial structure, and this is disadvantageous in miniaturized systems and in systems with a high functional density, in particular.

If only one glass plate is used in transmission, the solutions known from the prior art require a large installation space (e.g., US 2018/0217349 A1).

OBJECTIVES OF THE INVENTION

The invention is based on the object of proposing an option for adjusting a light ray, in which the disadvantages known from the prior art are reduced.

The object is achieved by means of the subjects of the main claim and the alternative independent claim. Advantageous developments are specified in the dependent claims.

The apparatus serves to adjust, in particular dynamically adjust, a light ray or a beam in a beam path of a microscope. For simplicity, hereinafter reference is made to a light ray. The apparatus comprises a plate arranged in the beam path and transparent to the wavelength range of the light ray to be adjusted. A first drive serves to generate a tilt movement of the plate about a first axis directed orthogonally to the beam path. A second drive serves to generate a tilt movement of the plate about a second axis directed both orthogonally to the beam path and orthogonally to the first axis.

It is a characteristic of an apparatus according to the invention that the first axis and the second axis are directed through a centre of the plate. The actuating forces caused by the first drive are transferred to the plate by means of a lever. Moreover, the first drive and the second drive are arranged within an angular range of 180°, advantageously within an angular range of 120°, preferably of 90°, about the beam path. Moreover, the plate can be tilted about each of the axes by an absolute angular value of up to 70° about a zero position.

In a further possible embodiment of the apparatus the plate has, about the first axis and about the second axis, a respective settable tilt angle range of up to 45° about a zero position.

The invention advantageously allows minimization of the number of interface transitions of the (wobble) plate. At the same time, the compactness of the apparatus is increased since the drives are arranged in space-saving fashion on only one side of the beam path and only have limited spatial requirements even during the operation of the apparatus.

Essentially, the apparatus according to the invention can be realized by the application of two constructional principles. The first drive is arranged stationarily in a first embodiment. The positioning movement of the first drive is transferred to the plate by means of a lever. In this case, the first axis runs virtually through a centre of the plate, with the result that the plate remains in the beam path during a rotation or tilt movement about the first axis. The second drive is fastened to the lever and is pivoted about the first axis in the case of a tilt movement caused by the first drive. The second axis also runs through the centre of the plate.

In a second constructional option, the first drive and the second drive are arranged stationarily. The actuating forces for generating the tilt movement of the plate about at least one of the axes are transferred from the relevant drive to the plate by means of a gear mechanism. In this embodiment, the first and the second axis are also directed through the centre of the plate, with the result that the position of a centre of the plate remains constant despite the deflection thereof about one or both axes. For example, the gear mechanism can be a Cardan gear mechanism.

For example, the plate may consist of glass or a suitable plastic. Depending on application, degree of desired deflection and design of the beam path, the side faces of the plate may extend in (plane) parallel fashion to one another or at an angle to one another (in wedge-shaped fashion).

It is further possible for the plate to be non-transparent for at least one wavelength range and, for example, to be coated with or occupied by a filter. In this way, the wavelengths not intended to be detected by means of a detector can advantageously be filtered out upstream of the detector, for example. For example, this measure advantageously serves to increase a signal-to-noise ratio of the measurement signals received.

The object of the invention is also achieved by a method for adjusting, in particular dynamically adjusting, a light ray in a beam path of a microscope, wherein an apparatus according to the invention is used. The term dynamic adjustment also includes an incremental adjustment.

A number of different spatial alignments of the plate are set in the method by virtue of, in a step 1, the first drive being controlled and the plate being tilted about the first axis in order to set an alignment of the plate relative to the first axis. In a step 2, the second drive is controlled and the plate is tilted about the second axis in order to set an alignment of the plate relative to the second axis. Steps 1 and 2 can be repeated in accordance with a predetermined chronological order of a number of n alignments, for example if the light ray should be spatially and/or temporally adjusted in a known manner.

A measurement signal caused by a light ray influenced in the first alignment is acquired in order to adjust the light ray. The measurement signal is evaluated and subsequent control commands for the drives are generated and carried out. By way of example, the measurement signal specifies a currently effected deflection of the light ray. If n alignments are successively set, for example in order to continually or dynamically adjust the light ray, then measurement signals of at least one preceding (n−1)-th alignment are acquired and evaluated, and subsequent control commands for the drives are generated and carried out.

BRIEF DESCRIPTION OF THE DRAWINGS

The invention is explained in more detail below on the basis of exemplary embodiments and drawings, in which.

DETAILED DESCRIPTION OF THE INVENTION

Figure 1:
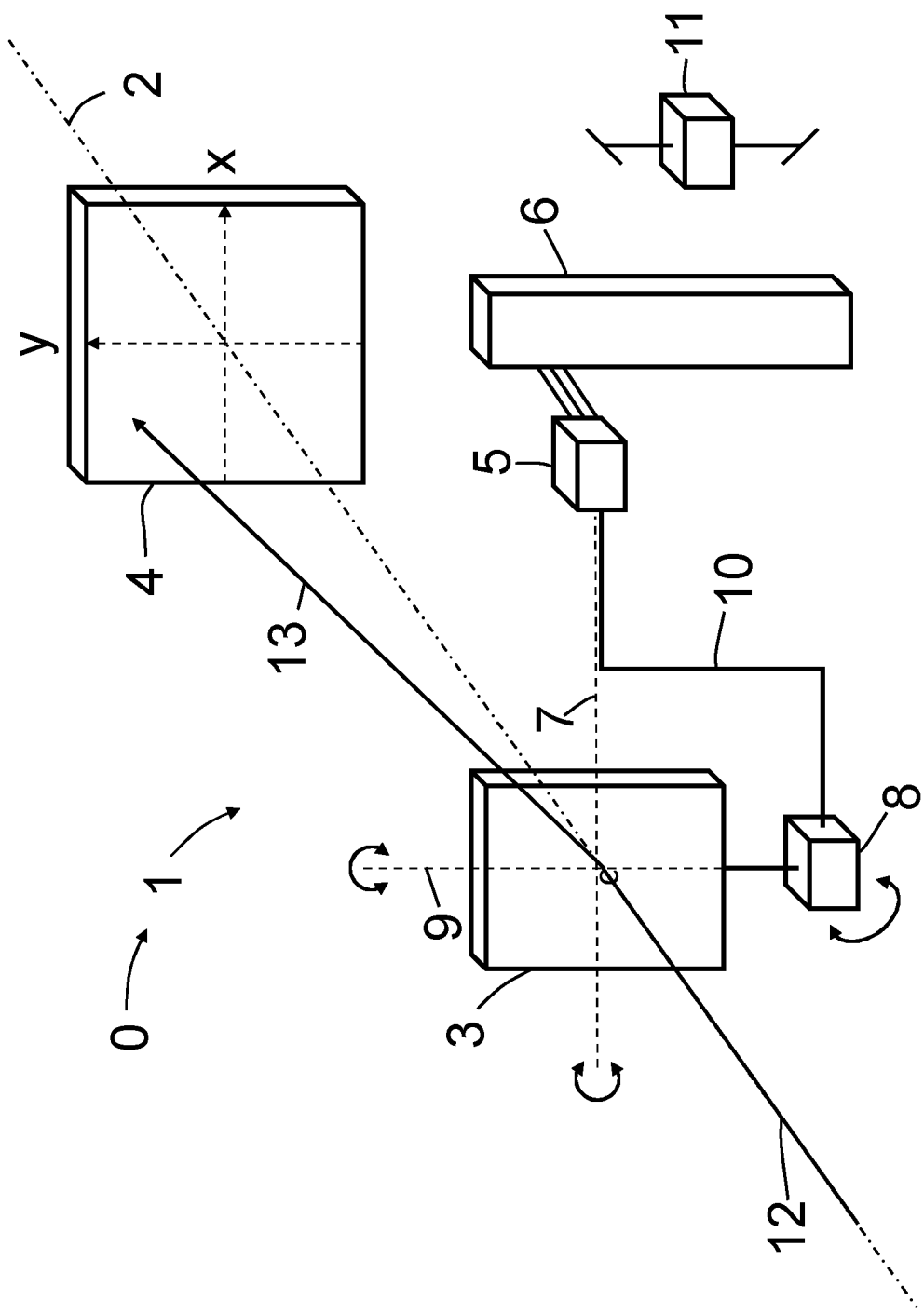
FIG. 1 shows a schematic illustration of a first exemplary embodiment of an apparatus according to the invention.

The following exemplary embodiments show only the essential technical elements for explaining the invention. Further mechanical and/or optical components may optionally be present.

In a first embodiment option for an apparatus 1 according to the invention, which is part of a microscope 0 (not depicted in detail), a plane parallel plate 3 and a detector 4 are arranged along an optical axis 2 of a beam path. With its main plane, the plate 3 extends orthogonal to the optical axis 2 and is transparent to the wavelength of a light ray 12 incident along the optical axis 2. In the exemplary embodiment, the detector 4 serves to acquire at least one measurement signal triggered by a light ray 13, wherein the departing light ray 13 is refracted by the effect of the plate 3 and deflected from its original course along the optical axis 2.

The plate 3 is connected to a first drive 5 via a lever 10 and can be rotated about a first axis 7 by means of the first drive 5. In this case, the first axis 7 is directed through the centre of the plate 3 and perpendicular to the optical axis 2. The first drive 5 is fastened stationarily to a body 6 or a housing 6 of the microscope 0. A second drive 8, by means of which the plate 3 is rotatable about a second axis 9, is arranged on the lever 10 between the first drive 5 and the plate 3. The second axis 9 is directed perpendicular to both the optical axis 2 and the first axis 7, and directed through the centre of the plate 3. The plate 3 may be arranged in a rotatably mounted holder or frame (not shown here).

As a result, the functionalities, separated in the prior art, of two successively arranged glass plates are combined in a single gimballed plate 3. The number of interface transition is halved as a consequence of suspending the plate 3 at the centre of rotation of a Cardan joint, which is particularly advantageous for low-light applications.

Figure 2:
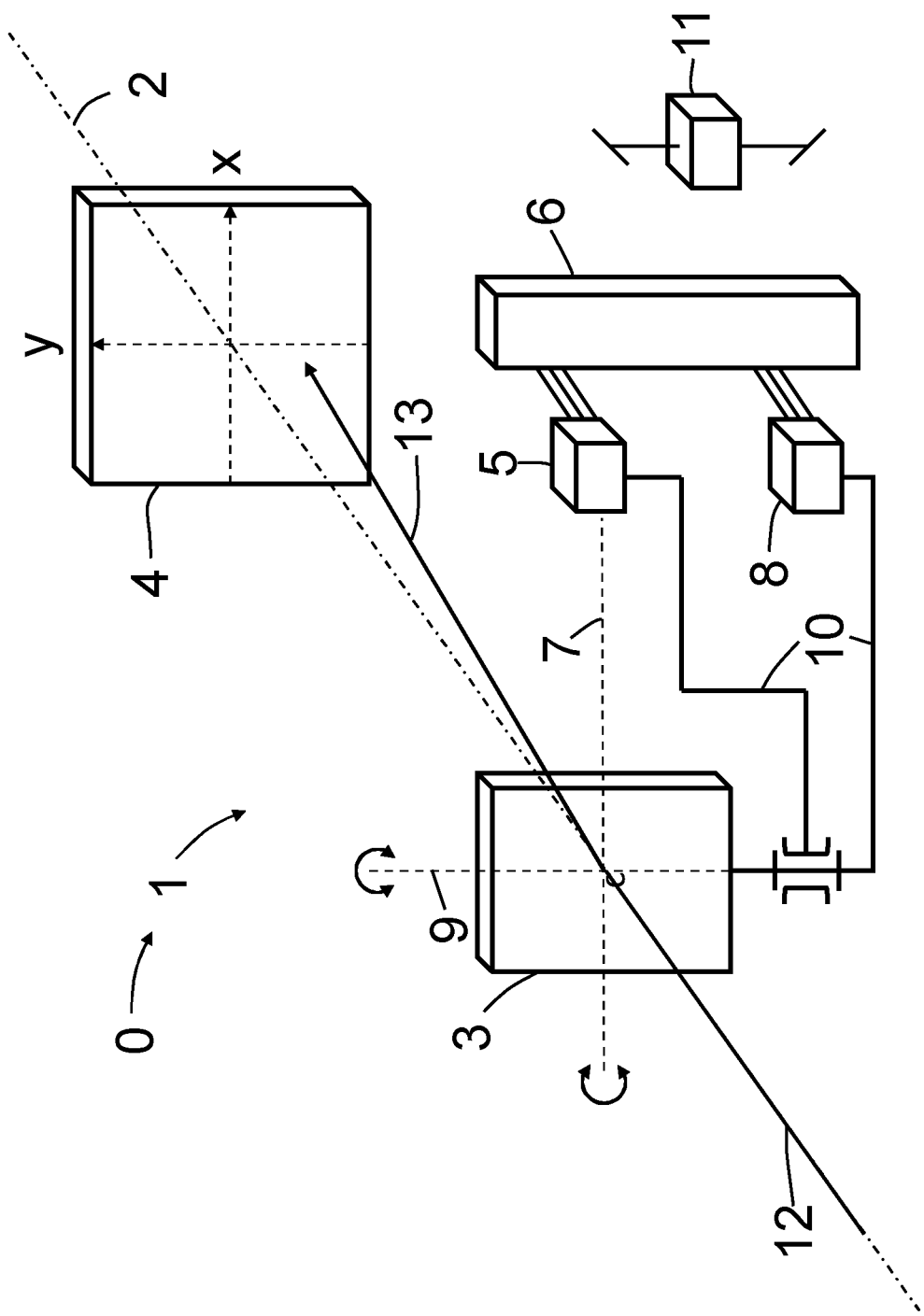
FIG. 2 shows a schematic illustration of a second exemplary embodiment of an apparatus according to the invention.

This principle is also followed by the second exemplary embodiment shown in FIG. 2. In this embodiment, both the first drive 5 and the second drive 8 are fastened stationarily to the body 6. The two drives 5, 8 are connected to the plate 3 via a respective lever 10, wherein the lever 10 connected to the first drive 5 imparts a rotation of the plate 3 about the first axis 7 and the lever 10 connected to the second drive 8 imparts a rotation about the second axis 9. Again, the axes 7 and 9 are directed through the centre of the plate 3, with the result that the plate 3 is always situated on the optical axis 2.

In both exemplary embodiments, the drives 5 and 8 and the detector 4 are connected to a controller 11 in a manner suitable for the transmission of data. Said controller is configured to evaluate measurement signals acquired and provided by the detector 4 and optionally to generate control commands and output these to the drives 5 and/or 8.

An alignment of the plate 3 can be set by virtue of the control commands being carried out by the drives 5 and 8. Depending on the relative position thereof with respect to the first and with respect to the second axis 7, 9, a light ray 12 incident along the optical axis 2 for example is deflected on account of the refractions at the boundaries of the plate 3 and is incident on the detector 4 as departing light ray 13.

A deflection in the direction of an exemplarily depicted y-axis is generated as a consequence of a rotation of the plate 3 about the first axis 7, while a rotation about the second axis 9 brings about a deflection in the direction of an exemplarily depicted x-axis.

Two different courses of the departing light ray 13 are shown in FIGS. 1 and 2. As a consequence, a respective measurement signal with different pieces of spatial information is acquired at the detector 4, which advantageously is a spatially resolving detector (2-D detector). By way of the controller 11, it is possible to compare the spatial information of a current point of incidence of the departing light ray 13 with the spatial information of a desired point of incidence and the current alignments of the plate 13 in respect of the two axes 7, 9, and control commands can optionally be generated, the latter leading to a different alignment of the plate 3 and to an incidence of the departing light ray 13 at a desired point of incidence.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1. Microscope
2. Apparatus
3. Optical axis

4. Plate
5. Detector
6. First drive
7. Body/housing
8. First axis
9. Second drive
10. Second axis
11. Lever
12. Controller
13. Incident light ray
14. Departing light ray

The invention claimed is:

1. Apparatus for adjusting a light ray in a beam path of a microscope, comprising
 a plate arranged in the beam path and transparent to the wavelength range of the light ray to be adjusted;
 a first drive for generating a tilt movement of the plate about a first axis directed orthogonally to the beam path;
 a second drive for generating a tilt movement of the plate about a second axis directed both orthogonally to the beam path and orthogonally to the first axis;
 wherein
 the first axis and the second axis are directed through a centre of the plate;
 actuating forces caused by the first drive are transferred to the plate by means of a lever;
 the first drive and the second drive are arranged within an angular range of 180° about the optical axis of the beam path; and
 the plate can be tilted about each of the axes by an absolute angular value of up to 70° about a zero position.

2. Apparatus according to claim 1, wherein said plate has, about the first axis and about the second axis, a respective settable tilt angle of up to 45° about a zero position.

3. Apparatus according to claim 1 wherein the first drive is arranged stationarily while the second drive is mounted on the lever and is pivoted about the first axis in the case of a tilt movement.

4. Apparatus according to claim 1 wherein the first drive and the second drive are arranged stationarily and the actuating forces for generating the tilt movement of the plate about at least one of the axes are transferred by means of a gear mechanism from the relevant drive to the plate.

5. Apparatus according to claim 1, wherein the side faces of the plate extend parallel to one another.

6. Apparatus according to claim 1, wherein the side faces of the plate extend at an angle to one another.

7. Apparatus according to claim 1, wherein the plate is non-transparent to at least one wavelength range.

8. Method for adjusting a light ray in a beam path of a microscope using an apparatus according to claim 1
 wherein
 setting a number of different spatial alignments of the plate by virtue of, in a
  step 1: controlling the first drive and tilting the plate about the first axis in order to set an alignment of the plate relative to the first axis;
  step 2: controlling the second drive and tilting the plate being tilted about the second axis in order to set an alignment of the plate relative to the second axis; and
  repeating steps 1 and 2 in accordance with a predetermined chronological order of a number of n alignments.

* * * * *